United States Patent [19]

Hirsch et al.

[11] 3,855,197

[45] Dec. 17, 1974

[54] GLYCOPROTEINS EXTRACTED FROM MICROORGANISMS

[75] Inventors: Jean Hirsch, Paris; Jean Pierre Buret, Osny, both of France

[73] Assignee: Laboritoires Cassenne, Paris, France

[22] Filed: Feb. 7, 1973

[21] Appl. No.: 330,403

Related U.S. Application Data

[63] Continuation-in-part of Ser. No. 38,482, May 18, 1970, abandoned.

[30] Foreign Application Priority Data

May 20, 1969 France .......................... 72.016297
Feb. 15, 1972 France .......................... 72.005016

[52] U.S. Cl. ................. 260/112 R, 195/29, 424/92, 424/177
[51] Int. Cl. ....................... C07g 7/00, C12d 13/06
[58] Field of Search ............... 195/29; 424/92, 177; 260/112 R

[56] References Cited
UNITED STATES PATENTS

| | | |
|---|---|---|
| 3,529,057 | 9/1970 | Tsuchiya et al ..................... 424/92 |
| 3,567,822 | 3/1971 | Sarbach et al ...................... 424/92 |
| 3,532,790 | 10/1970 | Greenbert et al .................... 424/92 |

*Primary Examiner*—Lionel M. Shapiro
*Attorney, Agent, or Firm*—Hammond & Littell

[57] ABSTRACT

Glycoproteins obtained from the microbial bodies of at least one type selected from the group consisting of Pneumococci, Micrococci, Streptococci, Neisseria, Staphylococci, Klebsellia, Pneumoniae and Hemophilus influenzae, or from a mixture of at least two of the said strains, or an association of different types of the same microbial species, having a molecular weight of 1 million or more, a content of combined hexoses between 60 and 65 percent, a content of protides of about 9 percent, a ratio of combined hexoses to protides of about 7, a molecular volume Ve/VO as determined through a gel of Sephadex G 200 of 1.0 to 1.2 in relation to a buffer having a pH value of 8, a content of $\alpha$-amine nitrogen between 1 and 2 percent, and a migration by electrophoresis in density gradient comprised between $\alpha$-proteins and $\beta$-proteins and their preparation.

14 Claims, No Drawings

GLYCOPROTEINS EXTRACTED FROM MICROORGANISMS

PRIOR APPLICATION

This application is a continuation-in-part of our co-pending, commonly assigned application Ser. No. 38,482 filed May 18, 1970, now abandoned.

STATE OF THE ART

A great number of preparations of microbic origin constituting microbic bodies lysated by chemical or physical means are known in the literature. Examples of these are French special medical patents (BSM) No. 5488 M. No. 6495 M and No. 6513 M. The said microbic lysates, alone or associated with an antibiotic or a polar solvent serve to release a rapid immunizing reaction or to enhance the defenses of the organisms against a microbic aggression. These lysates generally are derived from a determined microbic species and give a specific rather than general immunization. Moreover, they possess the disadvantage of being generally allergenic and their repeated use cannot be advised for this reason.

These lysates also form mixtures of varied protein fractions such as lipoproteins, mucopolysaccharides, nucleoproteins, etc., of which some fractions are immuno-active and some are inactive. The administration of such mixtures may induce undesirable side effects. The one skilled in the art, therefore, for therapeutic purposes desired a purified fraction of such a lysate which was the truly active principle. The purified fractions were expected to have rapid and sufficiently prolonged broad spectrum immunity.

The first attempt to solve this problem was tried by Lalouette [Revue d'Immunologie, Vol. 32 (1968), p. 105–150] starting with a somatic antigen extracted from a strain of Bacillus Subtilis L. The glycoprotein fraction obtained possessed a certain non-specific antigenic activity as well as anti-inflammatory activity.

OBJECTS OF THE INVENTION

It is an object of the invention to obtain glycoprotein extracts of one or more saprophyte or pathogenic strain with pronounced and broad immunizing and very intense anti-inflammatory activities.

It is another object of the invention to provide a novel process for the preparation of the said glycoprotein extracts.

It is a further object of the invention to provide novel therapeutic compositions and novel method of inducing immunization in warm-blooded animals, treating inflammations and stimulating the reticulo-endothelial system.

It is an additional object of the invention to provide a novel method of preventing bacterial infections in warm-blooded animals.

These and other objects and advantages of the invention will become obvious from the following detailed description.

THE INVENTION

The protein substances of the invention are slow $\alpha$-and $\beta$-glycoproteins extracted from at least one type of microbial bodies selected from the group consisting of Pneumococci, Streptococci, Neisseria, Micrococci, Staphylococci, Klebselliae Pneumoniae and hemophilus influenzae and from a mixture of at least 2 of the said strains or an association of different types of the same microbial species having a molecular weight of at least 1 million, a content of at least 50 percent, preferably 60 to 65 percent, of combined hexoses, a protide content of about 9 percent, a ratio of combined hexoses to protides of about 7, a molecular volume Ve/VO as determined through Sephadex G 200 gel of 1.0 to 1.2 in relation to a buffer with a pH of 8, an $\alpha$-amine nitrogen content of 1 to 2 percent and a migration by electrophoretic density gradient comprised between $\alpha$-proteins and $\beta$-proteins.

The protein substances of the invention are not derived from an extract of a particular, non-pathogenic strain but are derived from an extract of one or more saprophytic or pathogenic strains by chemical, physical or diastatic lysis of the microbial bodies followed by extraction of the microbial cellular content. The glycoprotein fraction thus obtained possesses a much more pronounced and rapid and much more general immunizing power and a much more intense anti-inflammatory activity. The products have the further advantage of not being allergisants, nor hyperthermisants and in not provoking intolerance phenomena at the point of injection.

Beginning from determined experimental conditions, one or more molecules of a glycoprotein nature can be isolated which molecules are responsible for the antigenic and anti-inflammatory properties of microbial preparations. This fraction is believed very different from that of Lalouette because of the distinct origins of the microbial cultures.

The invention allows one to obtain a purified standarizable fraction whose immunizing action against pathogenic agents can be reproduced and whose content of active glycoproteins can be precisely determined by chemical, physical, immunological and bacteriological tests. As far as the effected studies can prove, the glycoproteins obtained under these bacteriological conditions are a mixture of slow $\alpha$- and $\beta$-glycoproteins. This structure is shown by the electrophoretic behavior in relation to reference glycoproteins, particularly in relation to seric glycoproteins.

The chemical nature of these substances is also indicated by chemical reactions such as their content of hexoses and pentoses, by the approximate identification of molecular weight using agents of selective chromatography such as modified celluloses, sephadex or molecular sieves, by their content of protein fraction in the molecule determined by biuretogenic power, calculated with reference to a serum albumin standard, by the content of hexosamines and of sialic acid. The fraction formed by the glycoproteins obtained by starting from one or more of the said strains can be defined as being constituted of slow $\alpha$- and $\beta$-glycoproteins which are heat stable, acid soluble and soluble in ammonium sulfate solutions.

The molecular weight of the $\alpha$- and $\beta$-glycoproteins can be determined by chromatography on sephadex. Filtration chromatography determines the molecular volume Ve/VO which represents the ratio of the volume of solvent required for desorption of glycoproteins (Ve) to the volume of solvent required for elution of a large molecule completely excluded from a gel of Sephadex G 100 (Vo). The molecular volume Ve/VO for the glycoproteins obtained by Example I is between 2.5 and 3.0 in reference to a buffer solution of pH 8 consisting of a mixture of 0.1 M of tris-(hydroxymethyl)-amino methane and 0.1 M of sodium chloride.

The molecular weight of the $\alpha$- and $\beta$-glycoproteins can also be estimated by chromatography on Sephadex G 200. The molecular volumes Ve/VO of the glycoproteins obtained by Examples II to VII is between 1 and 1.2 in reference to the said buffer solution.

The glycoproteins can also be defined by the amount of combined hexoses determined by a specific reaction such as the colored reaction with orcinol. By these determinations, the glycoproteins obtained in Example I have a content of combined hexoses between 4 and 20 gm per 100. This content varies depending upon the degree of purification of the tested fraction and the quantity of mineral salts contained in the glycoprotein fraction.

The glycoproteins obtained in Example II have a combined hexoses content of about 50 percent for the product incompletely free of mineral salts and about 60 percent for the product completely free of mineral salts. The glycoproteins can also be defined by the ratio of combined hexoses content to biuretogenic power. The content of biuretogenic substances, determined in relation to a serum albumin standard, of the glycoproteins of Example I is on the order of 10 percent. The combined hexoses to biuretogenic power ratio varies between 0.25 and 2 as a function of the degree of purity. For the glycoproteins of Example II, the said ratio is less than or equal to 3.

The glycoproteins are finally defined by their solubility characteristics. In distilled water, they give a slightly opalescent solution which is not denatured by heating. The glycoproteins are soluble in solutions of perchloric acid, trichloroacetic acid and phytic acid. Particularly, the glycoproteins can be recovered without denaturation from a phytic acid solution having a pH of 2.10.

On the other hand, the glycoproteins can be defined by the intensity of their anti-inflammatory activity determined by standard tests such as experimental edema caused by carraghenin. The anti-inflammatory activity is parallel to the purity of the glycoprotein fraction. Finally, it is possible for the glycoprotein to contain a specific pentose and particularly fucose.

The novel process of the invention for obtaining the glycoprotein consists essentially of cultivating in a solid or liquid medium a microbial strain selected from the group consisting of Pneumococci, Streptococci, Micrococci, Neisseria, Staphylococci, Klebselliae *Pneumoniae* and *Hemophilus influenza* and mixtures of two or more of said strains or an association of different types of strains and after complete development, harvesting the microbial bodies manually or automatically, suspending the microbial bodies in an aqueous medium, proceeding with chemical, physical and/or enzymatic lysis of them, separating the debris of the microbial bodies, evaporating the resulting clear solution, subjecting the residue to the action of one or more lipid solvents, dissolving the delipidized residue in an aqueous solvent to remove from the residue proteins which are made insoluble by chemical or physical means, eliminating the precipitated proteins and selectively precipitating from the residual aqueous mixture free from proteins the desired slow glycoproteins by addition of a water-miscible solvent or a mixture of such solvents, and if necessary purifying the slow glycoproteins by fractionating on a selective support.

The slow glycoproteins thus obtained are derived from microbial cultures in a solid or liquid medium such as an enriched or non-enriched nutrient agar in a Petri dish or cultivated in shakers or in industrial fermenters in a liquid medium. After complete development of the microbial strain or strains, they are harvested manually or automatically and the microbial bodies are suspended in an aqueous media eventually in the presence of a buffer such as a solution of disodium phosphate or in the presence of an antiseptic such as thimerosal. The resulting suspension is titrated by photometry to determine the concentration of bacterial bodies so that the concentration can be adjusted to the desired titre and the suspension of microbial bodies are then subjected to lysis. This lysis may be effected in various ways, such as by chemical means, such as addition of a surface active agent, i.e., a sorbate of polyethylene-glycol, or an antiseptic or by physical means with the aid of ultrasonics or by heating or by a penetrating radiation or by the aid of an enzyme by addition of proteolytic or polymucosaccharolytic enzyme by addition of proteolytic or polymucosaccharolytic enzymes or any other means by which the microbial cellular content can be recovered without change and in as complete a way as possible.

The lysis of the microbial bodies can be mixed. A mixed lysis can be defined as being successively effected by means of a proteolytic enzyme such as trypsin, papain, bromelain, $\alpha$-chymotrypsin or pronase, or a polymucosaccharolytic enzyme such as lysozyme or hyaluronidase followed by a chemical agent such as organo-mercurial antiseptics, trichloroacetic acid, phytic acid or perchloric acid. Instead of trypsin, pancreatin or streptokinase or streptodornase may be used.

The degree and quality of the microbial lysis can be followed by photometry and when the lysis is judged to be satisfactory, a conservation or stabilizing agent may be added. The resulting bacterial lysate is present as an aqueous preparation eventually buffered and from which the debris of the microbial bodies is precipitated. The debris can then be removed by conventional means such as filtration or centrifuging.

The glycoproteins of the invention can then be extracted from this lysate freed of microbial bodies. The extraction is effected on the residue obtained by evaporation or by lyophilization of the lysate. The residue is delipided with one or more solvents such as ethyl ether, acetone or a mixture of methanol and methylal and the operation can be eventually repeated. The resulting delipidized powder is then put back into an aqueous solution.

The delipidation can be effected in two stages. In the first operation, the microbial lysate can be extracted with a mixture of methanol and methylal to dissolved the major part of the lipids, phospholipids and lipoproteins since the glycoprotein in insoluble in the mixture and can therefore be separated. The second delipidation is effected by refluxing in an oxygenated solvent which completes the extraction of the active fraction. The glycoprotein fraction thus isolated is only contaminated by more or less denatured proteins and mineral salts.

The said solution may be deproteinated by physical or chemical means. The deproteinization may be effected by heating the solution after the pH has been adjusted to about 5, preferably between 5 and 6. The deproteinzation may also be effected by simple heating or cooling or by addition of solvents or by biochemical defecation. The deproteinization is preferably effected by cooling to a temperature slightly above 0°C. This method has the advantage of simultaneously eliminating the proteins and a large part of the mineral salts.

The precipitate of proteins or nucleoproteins may be removed by filtration or centrifugation and the clear solution which is recovered consists essentially of a mixture of mineral salts and glycoproteins. The glycoproteins are selectively precipitated by adding to the solution one or more watermiscible solvents such as a mixture of acetone and ethanol or a mixture of methanol and methylal. The glycoprotein precipitate formed is separated, washed with the same solvents and dried.

The glycoprotein fraction is finally purified by a selective method of biochemistry such as dialysis; chromatography on silica or cellulose, electrophoresis, ultracentrifugation, etc., to obtain a very enriched glycoprotein fraction free of mineral salts. A last purification is ensured by filtration through a column of chemically modified cellulose, such as ethyl-cellulose, dimethylaminoethylcellulose, of appropriate mesh and molecular weight.

The preferred method consists of filtering a glycoprotein fraction solution through a column of Sephadex G 200 whereby the active fraction is not absorbed and can, therefore, be selectively separated. The active fraction obtained contains only a small amount of impurities such as mineral salts or nucleoproteins. These impurities can be removed by the addition of manganese salts or quaternary ammonium salts such as Zephirol or Cetavlon to obtain a still more pure glycoprotein fraction. The glycoproteins of the invention can be obtained in a practically pure state but this final purification is not necessary but only desirable.

In the preferred process of the invention, the following variables are preferred: (1) The microbial strain or strains are selected from the group consisting of Pneumococci siro types I, II, III, V and VIII; Streptococci group A, C and G; *Neisseria catarrhalis; Staphylococci aurei, Klebsellia pneumoniae* and *Hemophilus influenza;* (2) the lysis of the microbial bodies is effected by the addition of a surfaceactive agent or of an organomercurial antiseptic or by a mixed process of first an enzymatic lysis, then a chemical lysis effected by a combination of a surface active agent and a mercurial antiseptic such as sodium mercuriethyl thiosalicylate and the lysis is effected over a period of 8 – 15 days at a moderate temperature of about 40°C; (3) the delipidation is effected by extraction with ethyl ether or acetone or with a mixture of methanol-methylal and may be completed with a second extraction with an oxygenated solvent such as acetone; (4) the deproteinization of the delipidated product is effected by physical means in an acid or neutral medium by heating such as up to 100°C or in the cold and the acid may be trichloroacetic acid; (5) the selective precipitation of the slow $\alpha$- and $\beta$-glycoproteins is effected by addition of a mixture of methylal and methanol to an aqueous solution or by the addition of a mixture of acetone and alcohol to an aqueous solution, for example by the addition of a mixture of acetone and alcohol to an aqueous solution with a ratio of 1 to 20 volumes of the latter mixture per one volume of aqueous solution and (6) the slow $\alpha$- and $\beta$-glycoproteins may be purified by dialysis through a cellulose membrane, than by chromatography over Sephadex 200 followed by elution.

In a preferred process of the invention, the slow $\alpha$- and $\beta$-glycoproteins are further purified and therefore are more active. This is effected by eliminating for the most part protein degradation products that still remain in the mixture and in this way obtain a final product in an extremely purified form. This modification comprises subjecting the slow $\alpha$- and $\beta$-glycoproteins obtained above to diafiltration in aqueous solution with one or more membranes calibrated who are used as molecular sieves, separating the inactive or slightly active fraction, then recovering the very pure slow $\alpha$- and $\beta$-glycoproteins retained by the membrane of the diafiltration cell, subjecting the latter to chromatography over a hydrophilic polymer gel and recovering the non-fixed fraction.

Preferably, the membranes of reticulated selective permeability are those sold under the tradename Amicon XM 300 and selective permeability membranes are sold under the tradenames Amicon XM50, PM 30 and UM 2. The hydrophilic polymeric gel is preferably Sepharose 6B or Sephadex G 200.

The slow $\alpha$- and $\beta$-glycoproteins obtained by this modification of the process having a molecular weight equal to or greater than $10^6$ daltons, a combined hexose content of 60 to 65 percent and a ratio of hexose to proteic substances of about 7. The combined hexose content is generally about 62 percent and because of the difficulties in the standardization of the sugar measurement, the content varies between 60 and 65 percent without it being possible to stretch the conclusion of the purity of the fraction.

The therapeutic compositions of the invention are comprised of slow $\alpha$- and $\beta$-glycoproteins produced by the above described process and an inert pharmaceutical carrier. The compositions may be in the form of powders, pomades, lotions creams, nose drops, ear drops, injectable solutions, lyophilized sterile powders for injections, sublingual tablets, aerosols, suppositories or ovules prepared in the usual manner. For example, the slow $\alpha$- and $\beta$-glycoproteins may be dissolved in an aqueous solvent to which is then added a preservative or a thickening agent or an adhesive agent or emulsifer to obtain the desired form. The composition can also contain an agent for obtaining better diffusion in the tissues such as a polar solvent.

The therapeutic compositions having immunizing and anti-inflammatory properties and their property to stimulate the reticulo-endothelial system make them useful for increasing the defensive capacities of the organism. They have a rapid antigenic power and thereby increase the organism's resistance towards microbial aggression.

The anti-inflammatory properties of the compositions make them particularly useful for the treatment of osteoarticular affections, of infections of the respiratory system, of chronic effections of the respiratory tract, of infections of the higher respiratory tract, against veinopathologics and in phlebology, for the treatment of troubles resulting from infection of genital or urinary tract. These properties make them useful also in dermatology.

The antigenic properties of the compositions make them useful for the treatment of acute bronchitis, dermatitis, burns, microbial infection of the genito-urinary organs and in stomatology. The combination of anti-inflammatory and antigenic properties of the compositions are particularly beneficial in the treatment of osteo-articulary affections where the inflammatory phase is often accompanied by an autolysis phase producing auto-sensibilication phenomena.

The novel method of the invention for the treatment of inflammations, inducing immunization in warm-blooded animals and stimulating the reticulo-endothelial system comprises administering to warm-blooded animals a safe and effective amount of $\alpha$- and $\beta$-glycoproteins as described above. The said glycoproteins may be administered topically, percutaneously, transcutaneously, perlingually or permucuously. The usual daily dose is dependent upon the method of administration.

In the following examples there are described several preferred embodiments to illustrate the invention. However, it is to be understood that the invention is not intended to be limited to the specific embodiments.

EXAMPLE 1

A lysate obtained by starting with a liter of a culture concentrate of the following strains: $10^9$/cc of Penumococci, $10^9$/cc of Streptococci, $10^9$/cc of *Micrococci catarrhalis*, $5 \times 10^8$/cc of Staphylococci, $5 \times 10^8$/cc of *Klebsellia peneumoniae* and $5 \times 10^8$/cc of *Hemophilis influenza* was added to sodium merthiolate and the mixture was concentrated in vacuo to a syrupy consistency of a final volume of about 160 cc. The residue was then dissolved in about 5 times its volume of iced acetone and the mixture was filtered to recover the insouble fraction which was introduced into the thimble of a Soxhlet extracter. The residue was then continuously extracted with boiling acetone for 8 hours and then was extracted with ethyl ether. The resulting degreased solid fraction weighed between 20 and 30 gm and was removed from the extracter and dried at 37°C. The dried solid is dissolved in distilled water to obtain a 20 percent (weight-volume) solution which was then held at 4°C for 24 hours during which an abundant crystalline precipitate formed consisting mainly of sodium sulfate and sodium phosphate. The supernatant liquid was collected by filtration and the filtrate was then heated at 100°C for 30 minutes and the protein precipitate formed was removed by centrifuging.

The clear supernatant liquid contains essentially the glycoprotein fraction which was precipitated by additions of a mixture of equal parts of ethanol and acetone. A flaky precipitate developed in 65 minutes and was removed by centrifuging and was dried at 37°C to obtain 2 to 4 gm of glycoprotein fraction. This fraction was purified by dissolution in water to a concentration of 20 percent and the resulting solution was subjected to dialysis against water. The resulting solution was dried by lipophilization to obtain a very pure glycoprotein fraction of 1.4 – 1.5 gm. An aqueous solution of the said fraction was filtered through cellulose Sephadex G 200 and elution was with a buffer solution of a pH of 8 to obtain about 0.15 gm of the purest glycoprotein fraction. This fraction was constituted of slow $\alpha$- and $\beta$-glycoproteins and included 20 percent of combined hexoses. Its content of biuretogenic substances, determined by serum albumin reference, was 10 percent.

EXAMPLE 2

A culture medium consisting of 5 gm of meat extract, 5 gm of sodium chloride, 5 gm of casein peptone, 5 gm of yeast autolysate, 3.5 gm of dipotassium phosphate, 1.5 gm of monopotassium phosphate, 10 gm of glucose and 20 gm of phytone in distilled water to make one liter of solution was prepared and the pH of the solution was adjusted to 7.4–7.6. The solutions of glucose and phytone were introduced at the time of seeding after the solution was sterilized for 20 minutes. A culture of *Klebsellia pneumoniae* on an agar medium was diluted with 10 cc of culture broth with added glass marbles and after disintegration, the product was mixed with 50 cc of broth. The resulting solution was used for inoculation by siphoning for the rest of the culture broth which was then maintained at 37°C and a pH of 7.4–7.6 by automatic adjustments. An anti-foaming agent was added as a precaution and the flow of air and speed of agitation were regulated to optimum conditions.

The growth of the germs was estimated by a photometer and the number of germs was calculated as a fraction of the optical density measured in comparison with a standard curve. The culture required about 7 hours for complete development at which time the cultures contained about 120 billion germs per cc.

LYSIS

At the end of the culture period, $80\gamma$/cc of lysozyme hydrochloride dissolved in a few cc of sterile salt water were added to the culture and after standing in contact together for 1 hour at 56°C, the sterility was controlled and a 2.5 percent solution of sodium ethylmercurithiosalicylate and a solution of 33 percent polyethylene glycol sorbate (Tween 80) were added. The lysis proceeded under sterile conditions for 8 to 15 days at 40°C.

EXTRACTION

The liquor resulting from the lysis was concentrated in a rotating evaporator in vacuo or by lyophylization to about one third of its volume to obtain a crude, dark-colored product of very thick consistency. If desired, the microbic bodies can be removed by centrifuging before the concentration which is then effected with the supernatant liquid.

DELIPIDATION

The concentrated liquor was slowly suspended in 5 volumes of a mixture consisting of 1 volume of methanol and 4 volumes of methylal at room temperature and with strong agitation. A thick, strongly colored and sometimes agglomerated precipitate progressively formed and the supernatant liquor also has a brown color. The precipitate was allowed to settle for 15 minutes and the largest portion of the supernatant liquid was drawn off and the solid fraction was filtered and dried in vacuo. The precipitate was washed twice with 5 volumes of acetone, was then suspended in a minimum volume of acetone and was then transferred to the holder of a continuous extraction apparatus. The fraction was extracted for 3 days with acetone after which the heating was stopped and the solid fraction was recovered from the holder. The clycoprotein fraction at this stage of purification was a more or less agglomerated powder of brown or tan color.

DEPROTEINATION

The delipidized glycoprotein fraction was dissolved in 4 times its weight of water and held for 3 days at 4°C in a refrigerator. A shiny mass of denaturated protein compounds and a crystalline mass of mineral salts and mainly alkali metal phosphates were formed. The reaction mixture was filtered through a paper or gauze filter to remove the solid fraction and the filtrate was then centrifuged.

PRECIPITATION OF GLYCOPROTEINS

The clear supernatant liquid was treated with 5 volumes of a mixture of 1 volume of methanol and 1 volume of methylal added over 1 hour with strong stirring. The yellow speckled precipitate was recovered, washed rapidly with acetone and dried in vacuo over phosphoric acid for 24 to 48 hours. When the drying was almost complete, the product was ground and dried again at 45°C for 3 to 4 days to obtain 6 to 12 gm of light yellow colored glycoprotein per liter of culture medium.

EXAMPLE 3

The procedure of Example II was repeated with a glycoprotein fraction derived from Pneumococci except that the inoculum had added thereto 3.5 percent of a supplementary nutritive solution. This solution consisted of 250 gm of baker's yeast in 2000 cc of distilled water which was boiled for 5 minutes with continuous agitation, warm filtered through a paper filter and after adding 40 gm of glucose to 100 cc of the solution, it was diluted with distilled water up to 1000 cc. The pH of the solution was adjusted to 8 and was then sterilized for 1 hour at 110°C. The culture time was about 20 hours and the medium contained 120 billion germs per cc.

EXAMPLE 4

The procedure of Example III was repeated with a Streptococci culture and the time of the culture was 20 hours and it contained 100 billion germs per cc.

EXAMPLE 5

The procedure of Example II was repeated with a Staphylococci culture and the pH was maintained at 7.2. The culture time was 7 hours and the medium contained 80 billion germs per cc. The following stages were identical to those described in Example II.

EXAMPLE 6

The procedure of Example II was repeated with a *Neisseria catarrhalis* culture and the medium was enriched at the time of seeding with the addition of a 3 percent sterile ascite liquid. The pH of the culture medium was adjusted to 7 and the culture time was 25 hours. At the end, the culture content was 80 billion germs per cc.

EXAMPLE 7

The procedure of Example II was repeated with a mixture of microbial strains consisting of $120 \times 10^9$ of Pneumococci, $80 \times 10^9$ of Staphylococci, $100 \times 10^9$ of Streptococci, $120 \times 10^9$ of Pneumococci, $80 \times 10^9$ of *Neisseria catarrhalis* and $120 \times 10^9$ of *Klebsellia pneumoniae* and the yield of the active glycoprotein fraction was about 8 gm.

EXAMPLE 8

The bacterial strain, *Klebsiellia pneumoniae* was cultivated by fermentation in an appropriate media as in Example II and after completion of the culturing, the germs were subjected to lysis for 8 hours to obtain a stable bacterial suspension. The lysate was then concentrated and delipidated with a 4-1 methylal-methanol mixture. The certrifuge cake was washed with methanol and was taken up in water. Formal was added to the aqueous solution and the bacteria extract was subjected to a final purification by precipitation from the aqueous solution with a methylal-methanol mixture and washing of the precipitate with methanol.

The extract obtained was clear and soluble in aqueous media, was not precipitated from a trichloroacetic acid media at a concentration of 10 percent (parts by volume), with 0.6 N perchloric acid or with 3.6 M ammonium sulfate at a pH of 7.0° and 15°C. A partial precipitation was obtained by addition of manganese sulfate or cetyl pyridinium chloride. The principal constituents of the bacterial extract were evaluated and the dosages were indicated notably a content of combined neutral hexoses of 26 to 32 percent depending upon the lot and 6.2 percent of $\alpha$-amine nitrogen.

2 g of slow $\alpha$- and $\beta$-glycoproteins obtained by the above described procedure were dissolved in 400 ml of water and the resulting solution was introduced into a dialysis cell sealed with an Amicon XM 300 membrane. The solution was maintained in constant agitation and under a slight pressure (0.7 bar) and dialysis proceeded with constant displacement of the equilibrium of the dialysis with compensation of filtrate volume. Distilled water was added to keep a constant volume which was supplied in a continuous and considered manner so that the diafiltration operation was terminated when the total diafiltration volume was equal to or greater than 10 times the initial volume. The residue in the diafiltration cell was recovered and was chromatographed over Sepharose 6B gel. The fraction not fixed on the said gel was recovered and was dried by lyophilization.

Equally operable in several steps is first effected a diafiltration in a dialysis cell containing an Amicon PM 30 membrane, then a second dialysis cell containing an Amicon 50 X membrane and finally a third diafiltration in a cell containing an Amicon XM 300 membrane to obtain, after chromatography with Sepharose 6G gel and lyophilization of the excluded fraction, a fraction identical to that obtained after a sole diafiltration membrane.

The obtained slow $\alpha$- and $\beta$-glycoproteins (retained by XM 300 membrane and excluded by Sepharose 6B gel) had a molecular weight equal to or greater than $10^6$ daltons. The macromolecular substances had a composition superior in hexoses than the less pure fraction obtained in Examples I and II and is generally in the neighborhood of 62 percent. The content of $\alpha$-amine nitrogen, on the other hand, is lower (1.6 percent) and inferior to the fractions of Examples I and II.

The slow $\alpha$- and $\beta$-glycoproteins of this Example are not partially disassociated by an 8M urea solution or by solutions of reducing agents. On the other hand, the lower molecular weight molecules separated in the course of the diafiltrations, are able to reassociate spontaneously when the diassociation agent is eliminated. Nevertheless, the macromolecules obtained "de novo" are different from the slow $\alpha$- and $\beta$-glycoproteins retained by the Amicon XM 300 membrane so subjecting the slow $\alpha$- and $\beta$-glycoproteins to the action of diverse enzymes (pronase, trypsin, pancreatin, hyaluronidase) followed by fractionalization with membranes verifies that only a small part of the macromolecules are sensitive to enzymes and that the pharmacological activity is not sensibly modified.

The yield of the purification described in this example is about 30 to 35 percent and the slow $\alpha$- and $\beta$-glycoproteins obtained contain a combined hexose content of about 62 percent and a proteic substance content in the neighborhood of 9 percent and the ratio of combined hexoses to proteic substances is near 7. Yet interpretation is made difficult by the fact that the standardization of orcinol colorations are not bassed on real sugars contained in the slow $\alpha$- and $\beta$-glycoproteins but arbitrarily in mannose and galactose.

STRUCTURE STUDY

Acid hydrolysis under reduced pressure permits placing in evidence the different constituents of the molecule after separation with a cellulose membrane. Thus, the evidence shows a very great variety of amino acids that differentiate the slow $\alpha$- and $\beta$-glycoproteins from pepitidoglycanes and osamines and it verifies the presence of glucose, galactose and mannose among the sugars. It does not establish the presence of ribose.

After alkaline hydrolysis that causes a rupture of O-osidyles chains, study of the fragments formed shows that the long glycanic chains are attached to small proteic links. Therefore, successfully a molecule of glycoproteic nature is attested to by the macromolecular nature, by resistance to proteolytic enzymes and by resistance to lipolytic enzymes (lipase, pancreatin) and does not act by other means as a mucopolysaccharide since it is not precipitated with cetyl pyridinium chloride. Electrophoresis density gradient at a pH of 8.2 in the presence of a sodium barbital buffer principally shows a peak of $\alpha$-$\beta$ mobility.

PHARMACOLOGICAL STUDY

A. Allergenic Activity

The study of the sensibilizing action of the products of the invention was effected with the technique of Landsteiner. Three lots of 6 guinea pigs received intradermically and for 10 successive days the following: (1) 0.05 cc of a 1 percent solution of pure glycoprotein fraction; (2) 0.05 cc of a 0.5 percent solution of pure glycoprotein fraction; and (3) 0.05 cc of double distilled water. After the final injection, the animals were allowed to rest for 10 days.

The animals then received an injection capable of producing an allergic or anaphylactic reaction. To accomplish this, half of the animals in each lot received intradermically 0.1 cc of a 1 percent aqueous solution of the test product and the other half of each lot received intravenously 0.5 cc of a 0.1 percent aqueous solution of the test product. In the animals treated intradermically, evolution of skin pimples was observed in the next 48 hours during which no allergic reaction, usually shown by the appearance of petechiae or pustules, was observed. No difference was seen between the treated animals and the control animals.

In the animals treated intraveneously, their behavior was observed for 30 minutes after the injection and after the 24th hour, they were examined for the possible appearance of edema of the anaphylatic type. No abnormal phenomena was observed in the control animals or the treated animals and no edema was observed in hind paws nor in the abdomen nor restlessness in their behavior nor dyspnea phenomena. These results lead to the conclusion that the product appears devoid of any allergic effect.

B. Acute Toxicity

The acute toxicity was determined on 3 animal species. The test products were administered to lots of mice, rats and rabbits and after 8 days of observation, the $LD_{50}$ was graphically determined from the number od dead animals. The results were reported in Table I.

TABLE I

| Animal Species | Method of Administration | $LD_{50}$ |
|---|---|---|
| Mice | Oral | More than 1g/Kg |
|  | Subcutaneously | More than 500 mg/Kg |
| Rats | Subcutaneously | More than 200 mg/Kg |
| Rabbits | Subcutaneously | More than 50 mg/Kg |

C. Toxicity by Pulmonary Method

Rats were treated daily for four days for 10 minutes with an aerosol treatment with a 0.1 percent solution of the test product in physiological serum. The animals were killed and their lungs and bronchial tubes were removed and macroscopically examined. The weight of the fresh and dired specimens were determined. The control animals received an aerosol of physiological serum. No signs of edemic change or of hemorrhage were noted.

D. Local Tolerance

The test product was administered subcutaneously in the dorsal region of mice at a dose of 50 mg/Kg in 0.2 cc volume. After 48 hours of observation, the animals showed no signs of intolerance either locally or generally. At an autopsy, no signs of inflammation in the subcutaneous tissue was found and no difference between the treated and control animals was seen and resorption was normal.

E. Anti-Inflammatory Activity Determination

1. Podal Edema with Carraghenin

The anti-inflammatory activity of the product of Example I was studied when administered intraperitoneally, subcutaneously, intramuscularly and locally. 0.05 cc of a sterile suspension of 1 percent carraghenin was administered to the tibio-tarsus joint of the hind paw of male rats having an average weight of 130 to 150 gm. The test product was administered 48 hours, 24 hours and 1 hour before, at the same time and 1 hour after injection of the phlebogenic agent. The volume of the paw was measured by plethysmography 3 hours, 5 hours and 24 hours after the start of inflammation. The difference in the volume of the paws of the treated animals and control animals shows the anti-inflammatory activity of the product. The results are shown in Table II.

TABLE II

| | Percentage of Regression in Relation to Controls | | | | |
|---|---|---|---|---|---|
| Methods and Doses of Administration | Administration before Phlebogenic Agent | | | Administration at the same time as Phlebogenic Agent | Administration 1 hour after Phlebogenic Agent |
| | 48 hrs | 24 hrs | 1 hour | | |
| Intra-Peritoneally | | | | | |
| 100 mg/kg | 52% | 32% | 73% | 41% | 72% – 23%** |
| 50 mg/kg | 43% | 30% | 66% | | |

TABLE II—Continued

| Methods and Doses of Administration | Percentage of Regression in Relation to Controls | | |
|---|---|---|---|
| | Administration before Phlebogenic Agent | Administration at the same time as Phlebogenic Agent | Administration 1 hour after Phlebogenic Agent |
| 20 mg/kg | 55% | | |
| 10 mg/kg | 30% | | |
| Subcutaneously | | | |
| 50 mg/kg | 10%** | | |
| Intramuscularly | | | |
| 100 mg/kg | 41% – 18%** | | 48% – 50%* |
| 50 mg/kg | 50% – 28%** | | |
| 20 mg/kg | 40% – 20%** | | |
| 10 mg/kg | 18% – 10%** | | |
| Locally | | | |
| 10 mg | 70% | 0% | |

Measurements taken:
 *5 hours after start of inflammation
 **24 hours after start of inflammation
In all other cases, measurements taken 3 hours after inception of inflammation.

Table III compares the percent protection against inflammation with the glycoprotein fractions of Example I and II relative to the edema of the paws of the control animals.

TABLE III

| Dose in mg/kg | Fraction of Example I | | Fraction of Example II | |
|---|---|---|---|---|
| | 3h. | 5h. | 3h. | 5h. |
| 2 | 71% | 61.5% | 74% | 74% |
| 1 | 57% | 52% | 59% | 61% |
| 0.5 | (44% (51% | 30% | (51% (61% | 42% |
| 0.2 | 47.5% | 44% | (58% (58% | 35% 43% |
| 0.1 | (39% (44% | 38% | (57% (45% | 46.5% |
| 0.05 | 30% | 15% | 36% | 27% |

The glycoprotein fraction of Example II is more active and has a more prolonged anti-inflammatory activity than the product of Example I, even at the remarkably low dose of 0.05 mg/kg.

The anti-inflammatory activity of glycoprotein fractions obtained from other strains was also determined in the same test. The following results were obtained.

TABLE IV

| Strain | Dose in mg/kg | % of Protection |
|---|---|---|
| Neisseria Catarrhalis | 2.0 | (62 (73 |
| | 0.2 | (38 |
| Staphylococci | 2. | (25 40 |
| | 0.2 | 22 |
| Pneumococci | 2 | 24 |
| | 0.2 | 7 |

2. Podal Edema with Kaolin

The test for podal edema due to kaolin was effected under the same conditions as in test 1. The product of Example I was administered introperitoneally one hour before and at the same time as the phlebogenic agent, kaolin and the results are summarized in Table V.

TABLE V

| Doses in mg/kg | % of Protection Compared w/Controls | | | |
|---|---|---|---|---|
| | 1 hour before | | At the same time | |
| | 3 hr | 24 hr | 3 hr | 24 hr |
| 100 | 65% | 35%** | 55% | 28% |
| 50 | 37% | 0%** | 51 | 27 |

3. Granuloma Test with Cotton

This test used a similar technique of that of Singer [Proced. Soc. Exp. Biol. Med., Vol. 92 (1956), p. 23] as modified Arth et al [J.A.C.S., Vol. 80 (1958), p. 3161]. Female rats having an average weight of 100 to 120 gm received a subcutaneous bilateral ventral implantation of 4 pellets of cotton weighing about 5 mg. The product of Example I was then daily administered peritoneally at a dose of 100 mg/kg for 8 consecutive days with the first administration being immediately after the implantation. The rats were killed on the 8th day and the pellets and the covering of granuloma tissue was excised and weighed. After deducting for the weight of the cotton, the weights of the fresh and dried granulomal formed in the female rats was expressed as a percentage of control granulomae. As a comparison product, delta cortisone was administered intraperitoneally at a dose of 5 mg/kg. The results are shown in Table VI.

TABLE VI

| Groups | Fresh Weight in mg | Dried Weight in mg | % Protection | |
|---|---|---|---|---|
| | | | Fresh Weight | Dried Weight |
| Controls | 69 | 16 | | |
| Product of Example I | 47.7 | 12 | 31% | 25% |
| Deltacortisone | 51.4 | 12 | 25% | 25% |

4. Pulmonary Edema with Acrolein

Female rats of Wistar strain weighing 180 to 200 gm were subjected to controlled aerosol sprays of acrolein. The rats were divided into 3 groups: (1) animals subjected to no treatment; (2) animals having been subjected to aerosols of acrolein; and (3) animals having been subjected for 4 days to an aerosol treatment of 10 minutes per day of a 0.1 percent solution of the test product in physiological serum and then was subjected to an aerosol of acrolein. 24 hours after treatment, the animals were killed and autopsied to remove the lungs and bronchial tubes. They are weighed fresh, then dried and the weight per 100 gm of living weight were determined. The results are shown in Table VII.

TABLE VII

| | LUNGS | | BRONCHIAL TUBES | |
|---|---|---|---|---|
| | Fresh Weight in | Dried Weight in | Fresh Weight in | Dried Weight in |
| Groups | mg/100 g | mg/100 g | mg/100g | mg/100g |
| 1 | 528.6 | 111.4 | 38.8 | 11.9 |
| 2 | 797.7 | 166.1 | 44.8 | 12.6 |
| 3 | 638.9 | 144.2 | 54.5 | 15.1 |

The results show that the product of the invention has a very important regression of pulmonary edema due to acrolein if preventively administered by aerosols in very weak concentrations. No signs of broncial inflammation were noted.

5. Podal Edema with Hemolysin α

An escarriform edema was invoked in the paw of a rat by injection of 0.1 cc of a solution titrating 10 U.I. of hemolysin α of staphylococci per cc. In the first hours following the injection, the appearance of an important edema was observed which became aggravated later and after 24 hours complicated by tarsal hemorrhages and hemolytic scabs. The slow α- and β-glycoproteins of Example I were administered before and after the hemolysin α injection intraperitoneally, intramuscularly and locally. The paw was measured 3 hours, 5 hours, 24 hours and 48 hours after the injection and the results are shown in Table VIII.

agent injection and the results are shown in Table IX.

TABLE IX

| Time in Hours | % protection compared to controls |
|---|---|
| 2 | 40 |
| 3 | 35.5 |
| 4 | 30 |
| 5 | 28 |

The results show that when administered by the pulmonary, the compounds of the invention give a considerable protection against podal edema caused by carraghenin even at very low doses.

7. Immunizing Power

The immunizing power was studied on mice inoculated with a suspension of pyogenic Streptococci, strain 5-61, digonnet 7. The Streptococci culture was prepared in buffered glucose broth. The suspensions were adjusted by nephelometry according to classical techniques. The resulting preparation was administered intraperitoneally to the animals at a dose of 100 mg/Kg by injection of 0.5 cc per 20 gm of body weight of an adjusted aqueous solution. The product was administered 24 and 96 hours before innoculation with the following dilution of Streptococci: $10^{-6}$, $10^{-7}$, $10^{-8}$, $10^{-9}$, and $10^{-11}$. The results are shown in Table X.

TABLE X

| | | | | % of Mortality | | | |
|---|---|---|---|---|---|---|---|
| | | 24 HOURS | | | | 96 HOURS | |
| Group | $10^{-6}$ | $10^{-7}$ | $10^{-8}$ | $10^{-9}$ | $10^{-11}$ | $10^{-9}$ | $10^{-11}$ |
| Controls | 100 | 100 | 90 | 70 | 50 | 80 | 50 |
| Treated | 70 | 60 | 50 | 40 | 0 | 50 | 0 |

The survivors were observed for an additional 8 days to verify that the results after 96 hours were constant. The product itself had no anti-bacterial power but had an important immunizing power as the $LD_{50}$ was re-

TABLE VIII

| Doses Administered | % of PROTECTION | | | Administration after injection of Hemolysin |
|---|---|---|---|---|
| | Administration before Injection of Hemolysin | | | |
| | 7 days | 24 H | 1 H | 3 H |
| Intraperitoneal | | | | |
| Slow α-β-glycoproteins mg/kg | | | 12% ** | |
| Intramuscular | | | | |
| Slow α-β-glycoproteins 50 mg/kg | | | 15% * | 13% – 14% ** |
| Local | | | | |
| Slow α-β-glycoprotein 10 mg/kg | 25% – 31% * 52% ** – 74% *** | 49% – 84% ** 85% *** | | |

Measures taken at 3 hours L6 * 5 hours
 24 hours L6 * 48 hours

6. Pulmonary Anti-Inflammatory Activity

Rats were subjected to a 10 minute aerosol treatment of a 0.1 percent solution of the test product in physiological serum for 3 consecutive days and then a podal edema was caused in the treated animals with carraghenin and was compared with control animals. The paw was measured 2,3,4 and 5 hours after the phlebogenic duced to 0 and the $LD_{100}$ were reduced to about the $LD_{50}$.

F. Anti-Inflammatory Activity

The anti-inflammatory activity was determined on plantary edema caused by local injection of different phlogogenic agents, each provoking a slightly different inflammatory reaction. The edema measurement was effected by plethysomometry before and after injection of phlogogenic agent. The test products were administered introperitoneally. One hour before the injection of the irritant product to determine the active dose in mg/Kg which caused a 40 percent regression of edema in comparison to the control animals. The results are reported in Table XI.

TABLE XI

| Phlogogenic Agent | $DA_{40}$ in mg/Kg |
|---|---|
| Carraghenin | 0.05 |
| Kaolin | 0.5 |
| Ovalbumin | 1 |
| Hemolysin | 0.2 |

The slow $\alpha$- and $\beta$-glycoprotein of Example 2 (glycoprotein A) and the slow $\alpha$- and $\beta$-glycoprotein of Example 8 (glycoprotein B) were compared by podal edema caused by carraghenin and were compared with commonly used antiinflammatory agents. The results are reported in Table XII.

TABLE XII

| Anti-inflammatory Agent | $DA_{40}$ in mg/Kg |
|---|---|
| Indomethacine | 2 |
| Deltacortisone | 5 |
| Phenylbutazone | 50 |
| Glycoprotein A | 0.05 |
| Glycoprotein B | 0.025 |

Glycoprotein A and especially glycoprotein B clearly show a very strong experimental anti-inflammatory activity which effect is characterized by its polyvalency of action in the majority of pharmacological tests. Contrary to other experimental anti-inflammatory agents, there is not observed an ulcergenic activity with either glycoprotein A or B.

G. Stimulation of Non-Specific Defenses

This stimulation was studied by the so called "clearance" of carbon test on mice which was inspired by the technique of Halpern. The tests consists injecting a suspension of colloidal carbon into the ocular sinus of the animal and appreciating as a function of time the kinetics of disappearance of carbon in the blood by effecting measurements of optical density. The products were administered intraperitoneally to the animals 24 and 48 hours before the test and the results are expressed as a percent of activity compared to controls after a single injection of colloidal carbon. The results are reported in Table XIII.

TABLE XIII

| Glycoprotein | Dose in mg/Kg | % activity 8 min. after injection | Controls 30 min. after injection |
|---|---|---|---|
| A | 1 | 50 | 81 |
| B | 1 | 52 | 84 |
| A | 0.5 | 46 | 77 |
| B | 0.5 | 45 | 82 |

The results of Table XIII show that the two products provoke an intense stimulation out of the organism defenses.

H. Antibacterial Activity of Glycoprotein B

Glycoproteins B release an intense and durable antibacterial activity at very low doses and this action is polyvalent and is exercised against both Gram negative and Gram positive germs. The action is more preventive than curative. The product was administered to mice before injection of the germs and the process was carried out with numerous varieties of germs but the knowledge of Klebsiella pneumonia and its ease of manipulation leads to the more frequent use thereof.

A dose of $1\gamma$/kg of glycoprotein A and of glycoprotein B assured a 90 percent protection against Klebsiella pneumonia, a 30 percent protection against Staphylococci and at a dose of $20\gamma$/Kg, 77 percent protection against Staphylococci. The antibacterial activity against Klebsiella pneumonia varies depending upon when the slow $\alpha$- and $\beta$-glycoproteins are administered. When administered 48 hours before infection, at the time of infection and 48 after infection, the percent of protection with glycoprotein B is 100, 55 and 10 percent, respectively and possesses a clearly preventive antibacterial activity.

CLINICAL STUDY

The glycoprotein fractions of Example 2 were used in the form of a cream containing 2 percent by weight of the active principle and was used in comparison with "Synalar" cream. The two products were applied to a symmetrical limb and to a reasonably equal skin surface. The symptoms observed were: acute skin inflammation, primititive or secondary as acute or subacute eczema, dryness or keratosic, contact dermatitis, professional dermatites, dyshidrosis, superficial burns and leg ulcers. Moreover, in the case of infections, the test product were administered after use of the anti-infectious drugs to speed up the healing. Also, some patients were treated at once with the cream containing the glycoprotein fraction to avoid the use of the usual local anti-infectious agents.

Definition of the Results:

| Very good | — | total rapid healing and superior to that given by Synalar used on another lesion of the same patient. |
| Good | — | The results were equal in quality and speed to those obtained with Synalar. |
| Fairly good | — | Complete or practically complete healing but slower than with Synalar |
| Null | — | No changes observed in the treated lesions |

Clinical Results

A hospital doctor treated 30 patients for the indications given above with the test cream and with Synalar. In two cases, the results were null, in 24 cases the results were good and in 4 cases the results were very good. There were no indications of intolerance or allergic reaction or recurrence.

A second doctor in his private practice and at his dispensary treated 30 patients for the above symptoms in comparison with Synalar. The results obtained were 2 null, 8 fairly good, 16 good and 4 very good and no indications of intolerance, recurrence or allergic reactions were observed.

A third doctor in private practice treated 15 patients for the above symptoms in comparison with Synalar. The results obtained were 3 null, 2 fairly good, 5 good and 3 very good. In this study the good results were obtained with 2 leg ulcers which healed rapidly and 2 dysidrosis which healed after having resisted other treatments. In one case considered good, the clinician estimated the results as unintrepretable when taken in context and the therapeutic association used. In one case, the product was not tolerated and the treatment was interrupted. The tolerance of the product was always good except in one case where an erythema appeared but the treatment had been done with occlusive dressings. In the 15 patients, no signs of allergic reaction or recurrance was observed.

A fourth doctor in a hospital treated 40 patients with the above symptoms in comparison with Synalar. The results obtained were 6 null, 10 fairly good, 14 good and 10 very good. In the 6 null cases, the clinician estimated that there were very heavy lesions and it is not known what the results of other treatments would have been since the improvement with Synalar was only very slight. Therefore, it is believed that the failures are not due to the product. The tolerance was perfect and in one case, a sensation of skin dryness was noted and in one case a burning sensation was noted. However, no objective lesion was detected on the 2 patients. No signs of allergenic reaction or recurrance were noted.

In summary, out of 115 patients, 2 results were uninterpretable, 11.6 percent were null, 17.3 percent were fairly good, 51.3 percent were good and 18.1 percent were very good. Only one case of local erythema was noted with the use of occlusive dressings and a case of subjective skin dryness and a case of burning sensation without apparent objective lesions were noted. In all cases, there was no allergeric reaction or recurrance.

Various modifications of the products and processes of the invention may be made without departing from the spirit or scope thereof and it is to be understood that the invention is to be limited only as defined in the appended claims.

We claim:

1. Glycoproteins extracted from at least one type of microbial bodies selected from the group consisting of Pneumococci, Streptococci, Neisseria, Micrococci, Staphylococci, *Klebsellia pheumoniae* and *Hemophilus influenzae* and from a mixture of at least 2 of the said strains or an association of different types of the same microbial species, said glycoproteins having a molecular weight of at least 1,000,000, being thermo stable and soluble in perchloric acid, phytic acid, ammonium sulfate and trichloroacetic acid, having a content of at least 50 percent, preferably 60 to 65 percent, of combined hexoses, a biuretogenic substance content of about 10 percent, a ratio of combined hexoses to protides of about 7, a molecular volume Ve/VO as determined through Sephadex G 200 gel of 1.0 to 1.2 in relation to a buffer with a pH of 8, an $\alpha$-amine nitrogen content of 1 to 2 percent and a migration by electrophoretic density gradient comprised between $\alpha$-proteins and $\beta$-proteins and acid hydrolysis under reduced pressure shows the presence of glucose, galactose and mannose but not ribose.

2. The glycoproteins of claim 1 having a 50 to 60 percent content of combined hexoses.

3. The glycoproteins of claim 2 wherein the ratio of combined hexoses to biuretogenic substances is 2.8 to 3.

4. The glycoproteins of claim 1 wherein the microbial bodies are *Klebsellia pneumoniae* and have a combined hexose content of 60 to 65 percent.

5. A process for the preparation of glycoproteins which comprises cultivating in a solid or liquid medium a microbial strain selected from the group consisting of Pneumococci, Streptococci, Neisseria, Micrococci. Staphylococci, *Klebsellia pneumoniae* and *Hemophilus influenza* and mistures of two or more of said strains or an association of different types of strains and after complete development, harvesting the microbial bodies manually or automatially, suspending the microbial bodies in an aqueous medium, proceeding with at least one chemical, physical and enzymatic lysis of the microbial bodies consisting of lysis effected with a surface-active agent, with a mercurial antiseptic, with ultrasonics, with penetrating radiation, with proteolytic enzymes and with polymucosaccharolytic enzymes, separating the debris of the microbial bodies, evaporating the resulting clear solution, subjecting the residue to the action of at least one lipid oxygenated solvent, dissolving the delipidized residue in an aqueous solvent, removing proteins from the residue, by heat or cold or a pH of 5 to 6 by addition of an organic or mineral acid, eliminating the precipitated proteins and selectively precipitating from the residual aqueous mixture free from proteins the desired glycoproteins by addition of at least one water-miscible solvent, and if necessary pruifying the glycoproteins by fractionating on a selective support.

6. The process of claim 5 wherein the surface-active agent is a sorbate of polyethyleneglycol.

7. The process of claim 5 wherein the microbial body lysis is effected with first enzymatic lysis followed by chemical lysis with a combination of a surface-active agent and a mercurial antiseptic.

8. The process of claim 5 wherein the solvent is selected from the group consisting of ether and acetone.

9. The process of claim 5 wherein the solvent is a mixture of methanol and methylal.

10. The process of claim 9 wherein the delipidation is completed by a second extraction with an oxygenated solvent.

11. The process of claim 5 wherein the selective precipitation is effected in an aqueous solution with a mixture of ethanol and acetone.

12. The process of claim 5 wherein the selective precipitation is effected in an aqueous solution with a mixture of methanol and methylal.

13. A process for the preparation of glycoproteins wherein the glycoproteins obtained by claim 5 are subjected to diafiltration in aqueous solution with one or more membranes calibrated which are used as molecular sieves, separating the inactive or slightly active fraction, then recovering the very pure glycoproteins retained by the membrane of the diafiltration cell subjecting the latter to chromatography over a hydrophilic polymeric gel and recovering the non-fixed fraction.

14. The process of claim 13 wherein the membrane is reticulated and has selective permeability.

* * * * *

CERTIFICATE OF CORRECTION

Patent No. 3,855,197     Dated December 17, 1974

Inventor(s) JEAN HIRSCH and JEAN PIERRE BURET

It is certified that error appears in the above-identified patent and that said Letters Patent are hereby corrected as shown below:

| Col. | Line | |
|---|---|---|
| Title Page [73] | | -- "Assignee: Laboritoires Cassenne" should be -- Laboratoires Cassenne -- |
| Title Page [30] | | -- "May 20, 1969 France....72.016297" should be -- May 20, 1969 France....69-16297 -- |
| | | -- "Feb. 15, 1972 France....72.005016" should be -- Feb. 15, 1972 France...72.05016 -- |
| Col. | Line | |
| 1 | 15 | -- "No. 5488M." should be -- No.5488M, -- |
| 1 | 44 | -- "strain" should be -- strains -- |
| 4 | 21 | -- "enzyme" should be -- enzymes -- |
| 4 | 21-22-23 | -- "by addition of proteolytic or polymucosaccharolytic enzymes" should be deleted |
| 6 | 57 | -- "effections" should be -- affections -- |
| 7 | 21 | -- "Penumo-" should be -- Pneumo- -- |
| 11 | 6 | -- "bassed" should be -- based -- |
| 12 | 30 | -- "dired" should be -- dried -- |
| 11 | 63 | -- "Methods" should be -- Method -- |
| 13 | 3 | -- "Methods" should be -- Method -- |
| 15 | 53 | -- "mg/kg" should be -- 100 mg/kg -- |
| 15 | 60 | -- delete "L6" |

PO-1050
(5/69)

UNITED STATES PATENT OFFICE
CERTIFICATE OF CORRECTION

Patent No. 3,855,197     Dated December 17, 1974

Page 2

Inventor(s) JEAN HIRSCH and JEAN PIERRE BURET

It is certified that error appears in the above-identified patent and that said Letters Patent are hereby corrected as shown below:

| Col. | Line | |
|------|------|---|
| 17 | 2 | -- "introperitoneally" should be -- intraperitoneally -- |
| 20 | 8 | -- "mistures" should be -- mixtures -- |

Signed and Sealed this nineteenth Day of August 1975

[SEAL]

Attest:

RUTH C. MASON
Attesting Officer

C. MARSHALL DANN
Commissioner of Patents and Trademarks